United States Patent
O'Banion et al.

(10) Patent No.: US 6,427,677 B1
(45) Date of Patent: *Aug. 6, 2002

(54) TILE SAW

(75) Inventors: Michael L. O'Banion, Westminster; Daniel Puzio, Baltimore; Jason D. Hardebeck, Bel Air, all of MD (US)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,769

(22) Filed: Oct. 7, 1999

Related U.S. Application Data

(60) Provisional application No. 60/106,658, filed on Nov. 2, 1998.

(51) Int. Cl.⁷ .................................. B28D 1/32
(52) U.S. Cl. .................. 125/23.02; 125/35; 125/13.01; 451/340; 451/393
(58) Field of Search .............................. 83/485, 486.1, 83/487; 451/150, 136, 264, 265, 272, 340, 364, 392, 393, 411; 125/12, 13.01, 14, 35, 23.01, 23.02; 268/73, 61; 144/286.1, 285, 287

(56) References Cited

U.S. PATENT DOCUMENTS

| 981,431 A | | 1/1911 | Knights | |
|---|---|---|---|---|
| 1,995,741 A | * | 3/1935 | Granite | 125/23.02 |

(List continued on next page.)

FOREIGN PATENT DOCUMENTS

| DE | 1861945 | 11/1962 |
|---|---|---|
| DE | 7705032 | 6/1977 |
| DE | 197710 | 10/1977 |
| DE | 8202621 | 1/1982 |
| DE | 9000778 | 1/1990 |
| DE | 9307682 | 5/1993 |
| FR | 2250598 | 6/1975 |
| JP | 6165716 | 4/1986 |
| JP | 63178101 | 11/1988 |
| JP | 336801 | 4/1991 |
| JP | 341309 | 6/1991 |
| JP | 7117002 | 5/1995 |
| JP | 8164504 | 6/1996 |
| JP | 8183001 | 7/1996 |
| JP | 11123611 | 5/1999 |
| JP | 11156633 | 6/1999 |
| JP | 3070929 | 6/2000 |

*Primary Examiner*—Derris H. Banks
(74) *Attorney, Agent, or Firm*—Adan Ayala

(57) ABSTRACT

A saw includes a base having a first length extending generally along a first direction, a table disposed on the base, a saw unit disposed on the base, wherein one of the table and the saw unit is movable relative to the base along the first direction over a range which exceeds the first length. The saw may also include a first stationary rail connected to the base and extending generally along the first direction and a first movable rail engaging the first stationary rail and extending generally parallel to the first stationary rail, the first movable rail being connected to the one of the table and saw unit. Preferably, the first movable rail is slidingly received over the first stationary rail. The saw may also include a first rack disposed on the first movable rail, and a first pinion disposed on the base, wherein the first pinion meshes with the first rack so that the first movable rail moves along the first direction upon rotation of the first pinion. Preferably, the saw further includes a second stationary rail connected to the base and extending generally along the first direction and substantially parallel to the second stationary rail, and a second movable rail engaging the second stationary rail and extending generally parallel to the first movable and second stationary rails, the second movable rail being connected to the one of the table and saw unit.

8 Claims, 8 Drawing Sheets

U.S. PATENT DOCUMENTS

| | | |
|---|---|---|
| 2,890,693 A | 6/1959 | Evans |
| 2,998,813 A | 9/1961 | Wilson |
| 3,621,829 A | 11/1971 | Maluck |
| 3,635,206 A | 1/1972 | Harclerode |
| 3,665,771 A | 5/1972 | Blatt |
| 4,248,115 A | 2/1981 | Brodbeck et al. |
| 4,315,494 A | 2/1982 | DiPlacido |
| 4,976,251 A | 12/1990 | Smith |
| 5,079,876 A | 1/1992 | Zumstein |
| 5,127,391 A | 7/1992 | O'Keefe |
| 5,398,458 A * | 3/1995 | Heriksen et al. .............. 125/35 |
| 5,482,026 A | 1/1996 | Russell |
| 5,676,124 A | 10/1997 | Lee |
| 5,741,175 A | 4/1998 | Voege |
| 5,947,103 A | 9/1999 | Saccon |
| 6,080,041 A | 6/2000 | Greenland |
| 6,112,785 A | 9/2000 | Yu |
| 6,119,676 A | 9/2000 | Greenland |
| 6,152,127 A | 11/2000 | Fuhrman et al |

* cited by examiner.

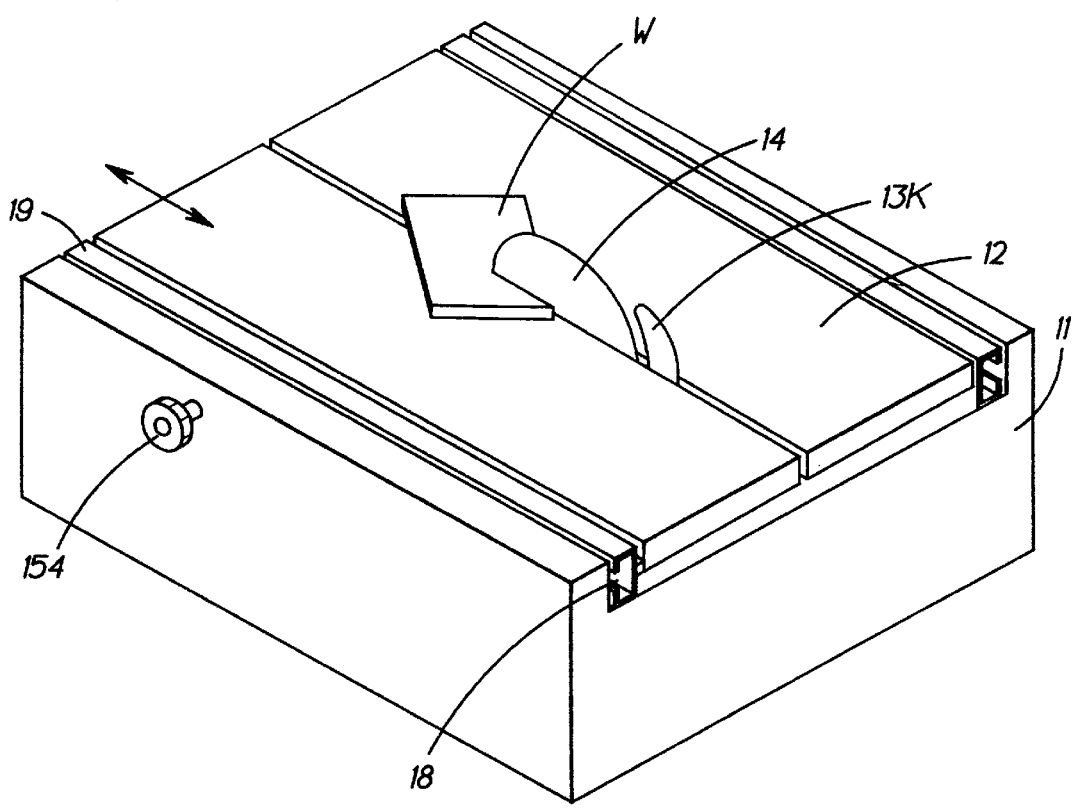

TILE SAW

This application claims benefit to Provisional application Ser. No. 60/106,658, filed Nov. 2, 1998.

FIELD OF THE INVENTION

This invention relates generally to tile or masonry saws and, more particularly, to tile saws with expanded capacity.

BACKGROUND OF THE INVENTION

A typical tile saw includes a base which supports a generally flat table top. A saw unit may be disposed on the base or table for cutting a workpiece, such as a tile or masonry brick, disposed on the table. However, the maximum cutting capacity of such tile saws is limited by the size of the machine, i.e., the envelope.

Accordingly, persons skilled in the art have devised a tile saw where the base has two tracks and the table has bearings or wheels riding on the tracks, so that the table can be slid relative to the saw unit for increased capacity. Such tile saws, however, are usually susceptible to dust collecting between the tracks and wheels, which creates binding between the base and the table. Ultimately, the binding may cause uneven, inaccurate cuts, which may translate into loss of time, materials and/or profit for the user.

Further, the capacity of such tile saws is usually limited to the length of the tracks. In other words, if a user wants increased capacity, he may have to lengthen the tracks. However, longer tracks may result in less portability of the tile saw.

It is therefore an object of this invention to provide a saw with increased cutting capacity without sacrificing portability.

SUMMARY OF THE INVENTION

In accordance with the present invention, an improved tile saw is employed. The saw comprises a base, a table disposed on the base, a saw unit disposed on the base, a first stationary rail having a first length extending generally along a first direction, the first stationary rail being connected to one of the table and saw unit, and a first movable rail engaging the first stationary rail and extending generally parallel to the first stationary rail, the first movable rail being connected to the other of the table and saw unit, wherein the first movable rail is movable with respect to the first stationary rail such that the other of the table and saw unit is movable generally along the first direction over a range which exceeds the first length. Preferably, the first movable rail is slidingly received over the first stationary rail.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 11 is a perspective side view of a fifth embodiment of a tile saw according to the present invention.

DETAILED DESCRIPTION

Figure 1:
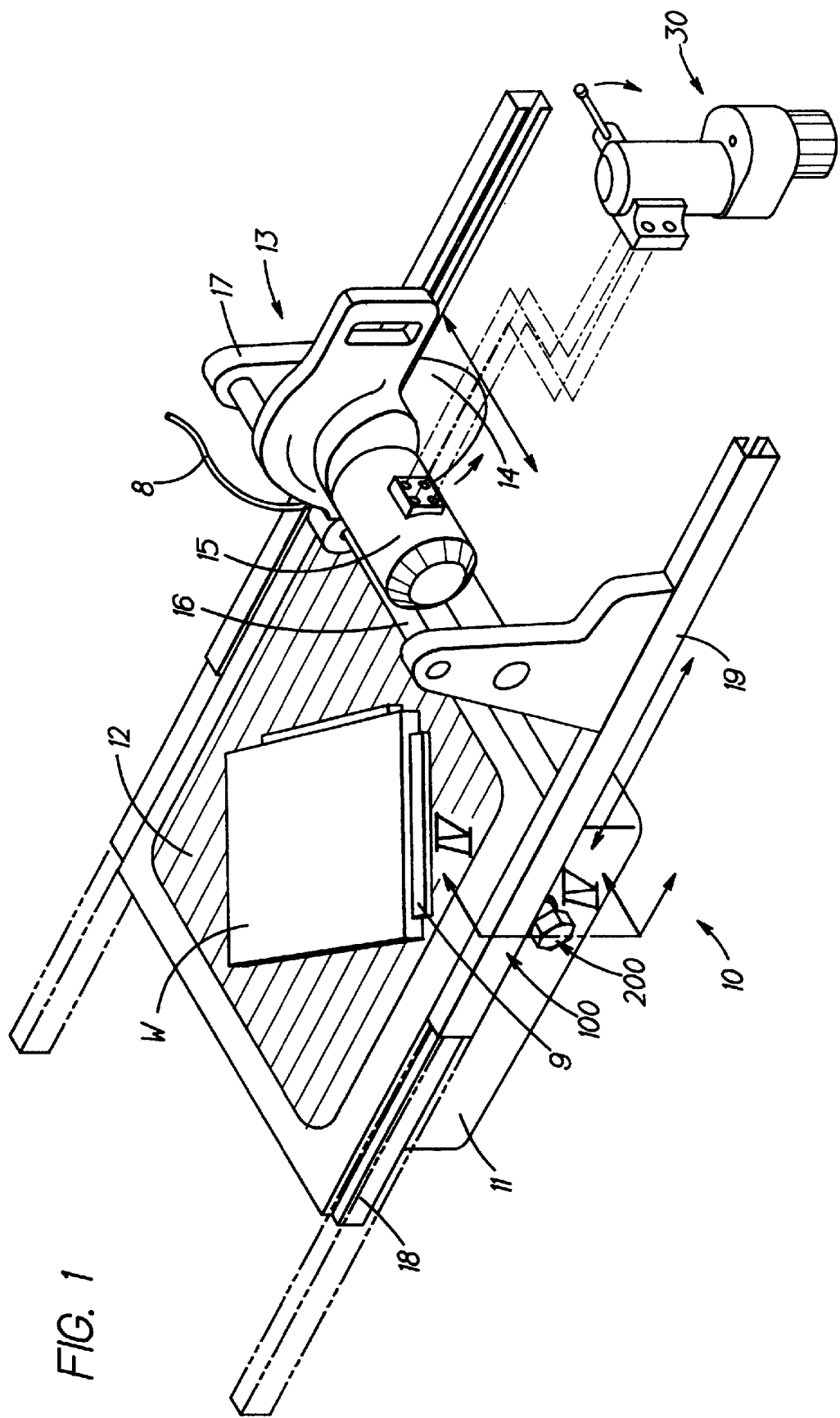
FIG. 1 is a perspective side view of a first embodiment of a tile saw according to the present invention.
Figure 2:
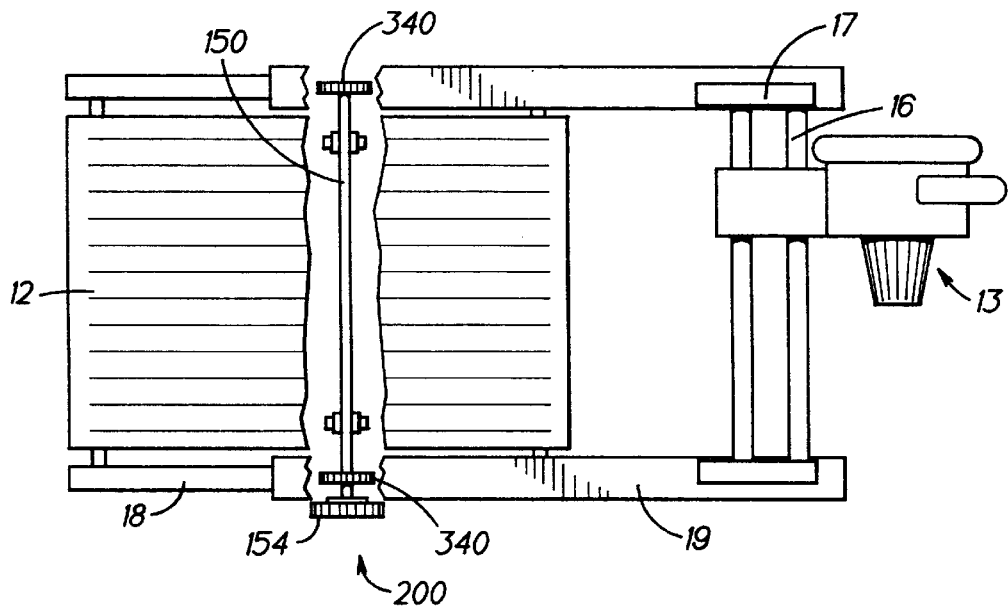
FIG. 2 is a plan view, partially in cross section, of the tile saw illustrated in FIG. 1.
Figure 3:
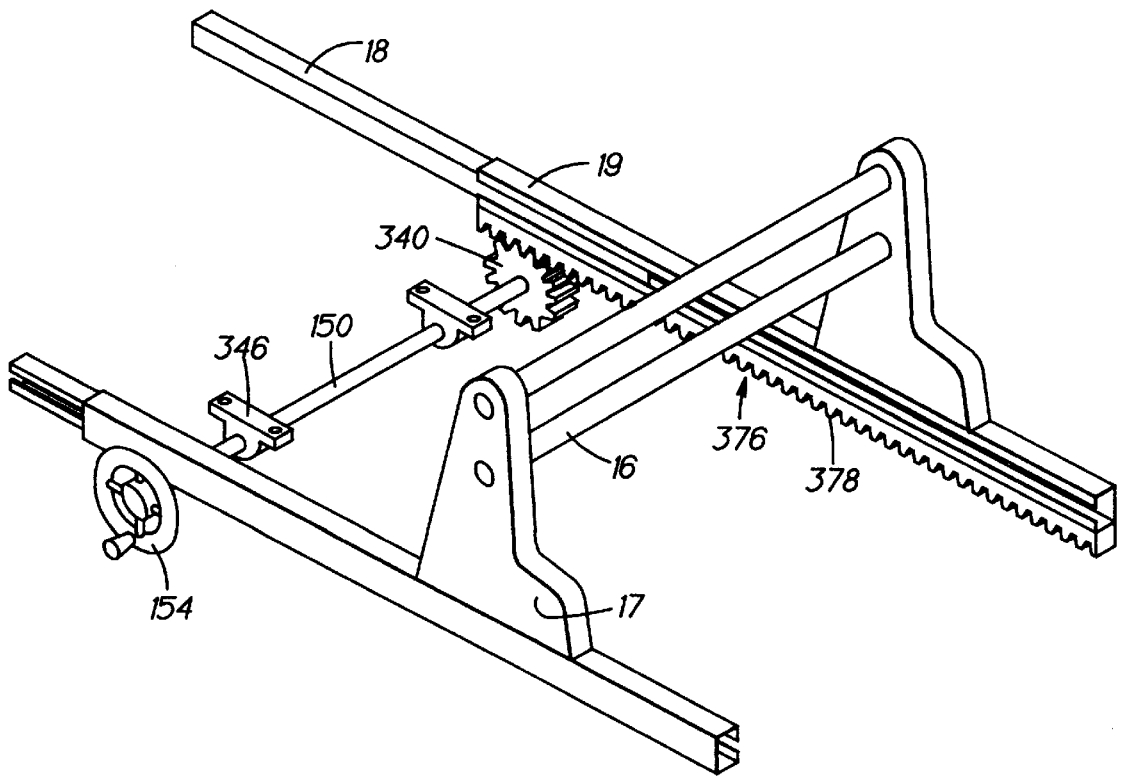
FIG. 3 is a perspective view showing an embodiment of a telescoping rack and pinion assembly according to the present invention.

The invention is now described with reference to the accompanying figures, wherein like numerals designate like parts. FIG. 1 illustrates a first embodiment of the present invention, where tile saw 10 comprises a base 11 which supports a generally rectangular work table 12. Slidable relative to table 12 is saw unit 13, which comprises a blade 14 and a motor 15 driving the blade 14. The saw unit 13 is slidably disposed on guide rods 16, so that the saw unit 13 can be positioned at any position along rods 16. Persons skilled in the art will recognize that one guide rod 16 may be used, but it is preferred to use at least two rods 16 in order to maximize stability.

Further, saw unit 13 can be adapted to bevel, i.e., change the angle of blade 14 relative to the table 12, as is known in the art.

Saw unit 13 also has a water conduit 8 for lubricating and cooling the blade 14, as is known in the art. Water sent through conduit 8 will drain into base 11 through table 12 and may be repumped through conduit 8 as is known in the art.

The saw unit 13 is preferably adapted so that a drill press 30 can be attached thereto. By changing the relative position of saw unit 13 and/or table 12, the drill press 30 can be positioned over a tile workpiece for making round or arcuate cuts. Accordingly, the drill press 30 may be provided with an annular or circular cutting tool, preferably made of diamond.

Rail assemblies 100 are used to provide slidable movement between the saw unit 13 and table 12. Persons skilled in the art are directed to U.S. Pat. No. 5,722,308, assigned to the present assignee, for further information on the rail assemblies 100 and their operation. Further, U.S. Pat. No. 5,722,308 is hereby incorporated by reference into the present specification.

Figure 4:
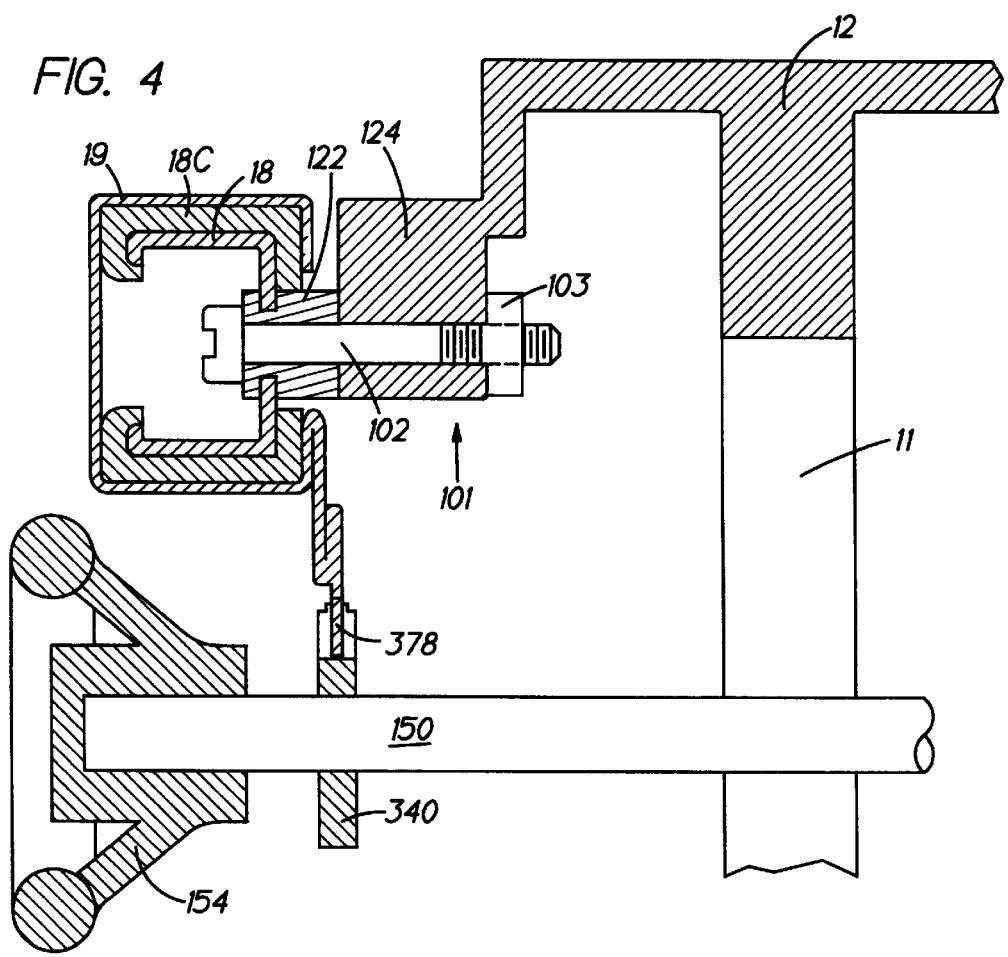
FIG. 4 is a side elevational view, partially in cross-section, along plane IV—IV of FIG. 1.

Rail assemblies 100 are each comprised of an inner rail 18 and an outer rail 19. Inner rails 18 are preferably disposed on the front and rear of table 12. Preferably, the inner rails 18 have a generally C-shaped cross-section and a length generally equal to the width of table 12. Inner rails 18 are fixedly secured to table 12 using a plurality of fasteners 101 which are preferably spaced along the entire length of inner rail 18. As shown in FIG. 4, fasteners 101 include a bolt 102, a nut 103 and a bushing 122. Bolt 102 extends through inner rail 110 and through a bracket 124 which is secured to or is an integral part of table 12. Bushing 122 is preferably made from UHMW-PE or low friction polymeric material and is located between inner rail 18 and bracket 124 with the assembly being secured by nut 103. Bushing 122 may extend over the entire length of inner rail 18.

A glide strip 18C may be disposed on or wrapped around inner rail 18 to facilitate the movement of outer rail 19 with respect to inner rail 18. In the preferred embodiment, glide strip 18C is made of UHMW polyethylene or a nylon based material injection molded over inner rail 18. Glide strip 18C preferably extends over the entire length of inner rail 18.

Outer rails 19 are generally C-shaped members slidingly received over the inner rails 18. Outer rails 19 are preferably made of steel and roll-formed into the desired shape. A rail mechanism 200 allows a user to move the outer rails 19 relative to the inner rails 18, as explained below.

Carriages 17 supporting guide rods 16 and saw unit 13 are fixedly disposed on the outer rails 19. Persons skilled in the art will recognize that the tile saw 10 may be designed so that only one carriage supports the guide rods 16 and saw unit 13.

By providing outer rails 19 which telescope with inner rails 18, the saw unit 13 is deployable beyond the envelope of work table 12 in order to provide additional cutting capacity, as shown in FIG. 1, yet maintaining a compact envelope for simplifying transportation of tile saw 10. The compact envelope of tile saw 10 facilitates both storage of tile saw 10 and the movement of tile saw 10 from one job site to the another.

Persons skilled in the art will recognize that, to perform the cut, the operator need only push saw unit 13 towards the workpiece. The rigid connection between the outer rails 19, the carriages 17 and the rails 16 will maintain the outer rails 19 moving together the same distance. Persons skilled in the art will recognize that other means to obtain the same result exist.

For example, outer rails 19 may comprise a rack 376 which can be integral with outer rail 19 or it can be a separate component attached to a lower extending flange of outer rail 19 by a plurality of screws. Rack 376 preferably extends over the entire length of outer rail 19. Rack 376 includes a plurality of rack teeth 378 which may extend over the entire surface of the rack. An enlarged tooth may be provided at the end of each rack 376 to limit the travel of outer rail 19 with respect to inner rail 18 in either direction, as disclosed in U.S. Pat. No. 5,722,308, which is again hereby incorporated by reference.

Rail mechanism 200 comprises a pinion shaft 150, a pair of pinion gears 340 and an adjustment wheel 154. Pinion gears 340 and adjustment wheel 154 are fixedly secured to pinion shaft 150 for rotation therewith. Pinion shaft 150 is rotatably secured to base 11 (preferably by bearing mounts 346) such that pinion gears 340 are engaged with rack teeth 378 on each outer rail 19 with adjustment wheel 154 preferably extending beyond the front outer rail 19 for accessibility by an individual. Thus, rotation of adjustment wheel 154 cause rotation of pinion shaft 150 and pinion gears 340 which, due to their engagement with rack teeth 378 of rack 376, cause longitudinal movement of each outer rail 19 with respect to each inner rail 18 and the movement of saw unit 13 relative to saw table 12.

Due to the fact that both front and rear pinion gears 340 rotate simultaneously and by the same amount due to their rotation with pinion shaft 150, both outer rails 19 will move together and the same distance due to the engagement of rack teeth 378 of each rack 376 with a respective pinion gear 340. This simultaneous and equal movement of each outer rail 19 will thus ensure that the relationship between saw unit 13 and table 12 will be maintained during the movement of the saw unit 13.

Accordingly, the present invention allows the saw unit 13 to be moved over a range of lengths which exceeds the length of the stationary inner rails 18. Preferably, the saw unit 13 can be moved beyond the width of the work table 12, outwardly of either side edge, without requiring that the stationary rails have a length which is greater than the width of the table to provide for such movement.

The telescoping rails of the present invention have sufficient clearance between each inner rail and outer rail disposed thereon to accommodate the non-straightness of the rails. This clearance can cause excessive end play of the outer rail as it moves toward its totally extended position. Thus, it may be desirable, in the present invention, to provide a system for stabilizing the outer rail as it moves to it fully extended position.

Figure 5A:
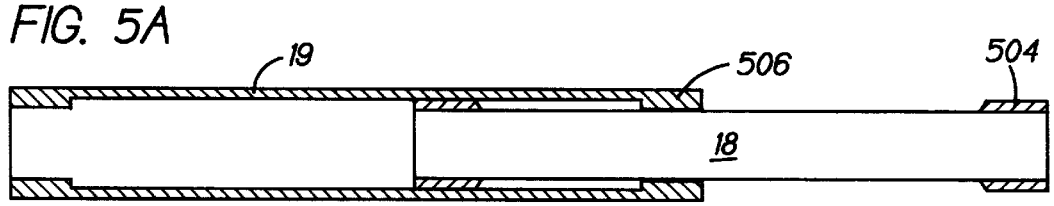
FIGS. 5A and 5B are schematic illustrations of the telescoping fence assembly according to the present invention.
Figure 5B:
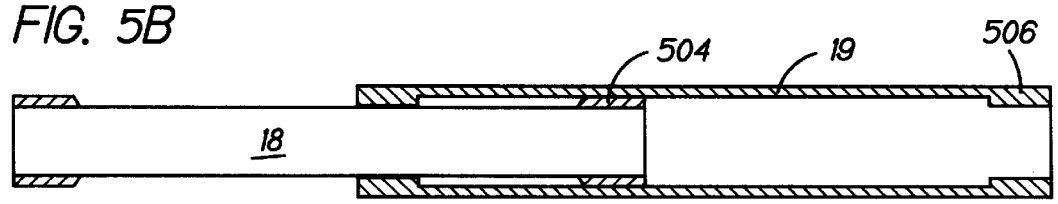

Accordingly, FIGS. 5A and 5B schematically represent an inner rail 18 and an outer rail 19. As before, inner rail 18 is adapted to be secured to work table 12. Outer rail 19 telescopically engages inner rail 18 as shown previously with sufficient clearance maintained between the inner and outer rails to accommodate any non-straightness. Each end of inner rail 18 would include an outwardly extending bump 504 and each end of outer rail 19 would include an inwardly extending bump 506. Bumps 504 contact the inner surface of outer rail 19 while bumps 506 contact the outer surface of inner rail 18. These contact points help stabilize the movable rail against vertical movement in any extended position of the movable rails. However, bumps 504 and 506 must be provided in a manner which allows for outer rail 19 to move from the position shown in FIG. 5A to that shown in 5B. That is, it is necessary for inwardly extending bumps 506 to pass through outwardly extending bumps 504.

Figure 6A:
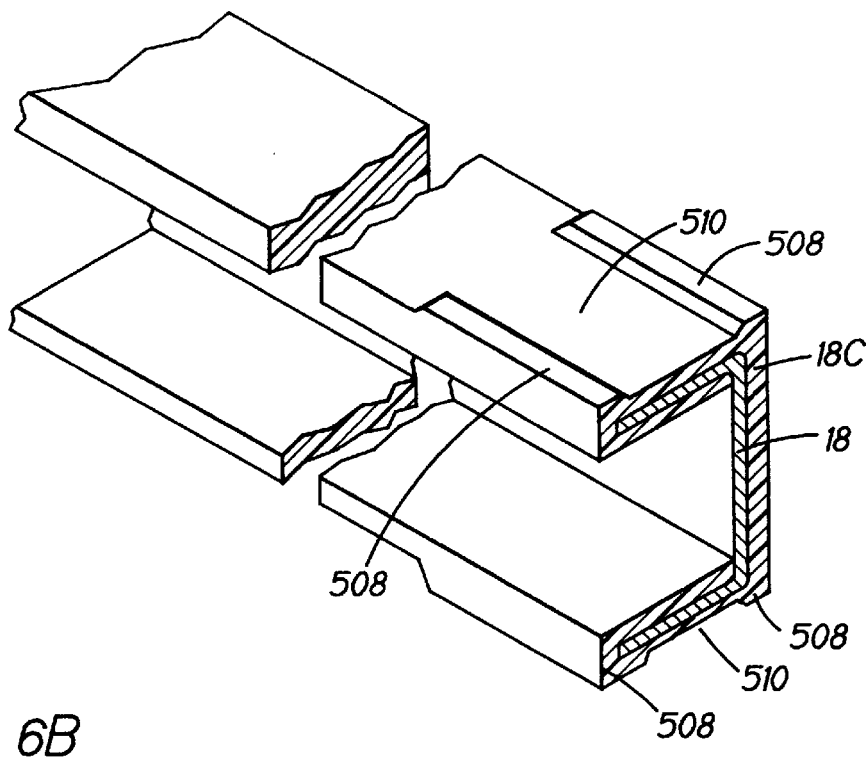
FIGS. 6A and 6B are enlarged perspective views illustrating the bumps schematically shown in FIGS. 5A and 5B.

FIG. 6A illustrates a construction of inner rail 18 and outer rail 19 which provides bumps 504 and 506 which pass through each other. As explained above, guide strip 18C may be injection molded over inner rail 18 as shown. Glide strip 18C may be molded so as define a pair of pads 508 on the upper and lower surfaces of inner rail 18 at each end. Each pair of pads 508 defines a channel 510 extending longitudinally along the length of inner rail 18 for a short distance. The pair of pads 508 are designed such that they slidingly engage the interior surfaces of outer rail 19 to reduce or eliminate the clearances between the two rails. Pads 508 also could be a separate component assembled to inner rail 18.

Figure 6B:
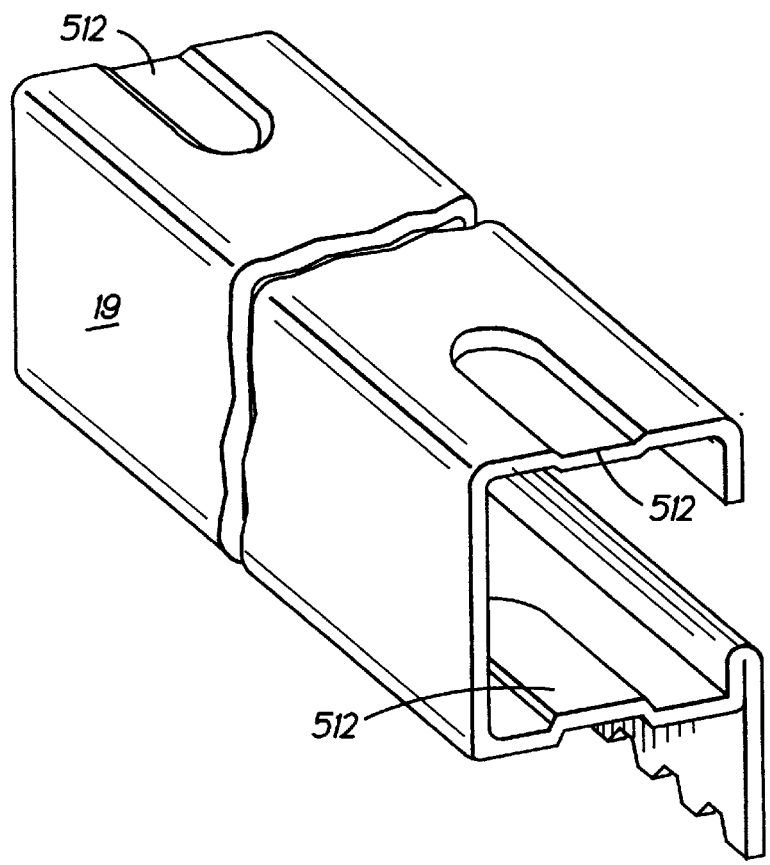

FIG. 6B illustrates outer rail 19 incorporating inwardly extending pads 512 integrally formed as a part of outer rail 19 at each end. One pad 512 is formed into an upper wall of outer rail 19 while the second pad 512 is formed into the lower wall of outer rail 19. Pads 512 may be formed by stamping the rails inwardly in the roll forming process of the rails. Pads 512 are positioned to align with channels 510 defined by pads 508 such that outer rail 19 is allowed to move outwardly beyond inner rail 18 in both directions as is schematically illustrated in FIGS. 5A and 5B. Pads 508 function as bumps 504 and pads 512 function as bumps 506 as described with reference to FIGS. 5A and 5B. Thus, the contact of pads 508 and 512 with outer rail 19 and inner rail 18, respectively, stabilizes the outer rails in the extended position. Persons skilled in the art are directed to U.S. Pat. No. 5,722,308, for other means for providing bumps 504 and 506.

Furthermore, persons skilled in the art are directed to U.S. Pat. No. 5,722,308, for further means for moving the outer rails 19 in relation to the inner rails 18.

Figure 7:
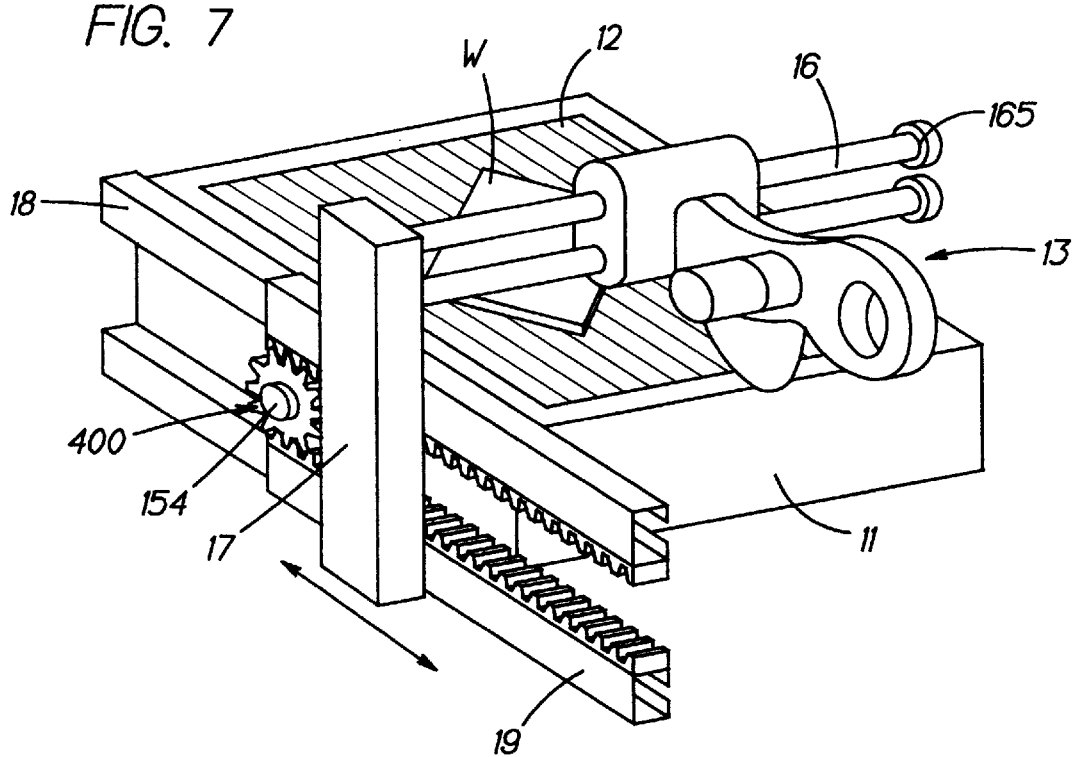
FIG. 7 is a perspective side view of a second embodiment of a tile saw according to the present invention.
Figure 8:
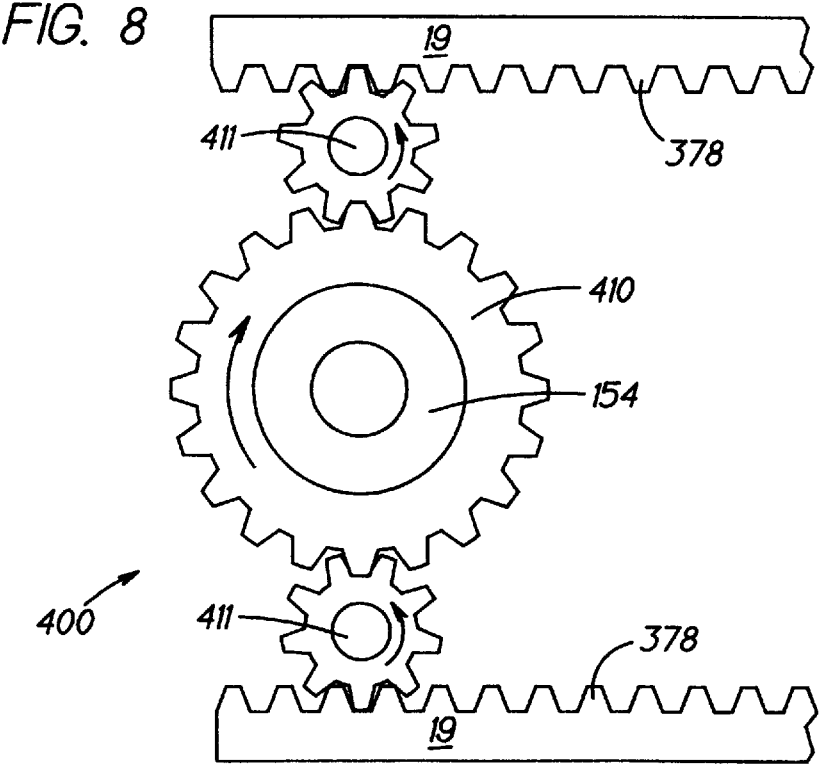
FIG. 8 is a side elevational view of the knob drive assembly of the second embodiment.

FIG. 7 illustrates a second embodiment of the tile saw according to the present invention, where like numerals refer to like parts. This embodiment operates in a similar manner to the first embodiment. The main differences between this embodiment and the previous one is that: (1) inner rails 18 may be attached on the same side of base 11; (2) carriage 17 may be connected to both outer rails 19; and/or (3) rods 16 may be cantilevered. Preferably a first inner rail 18 is disposed above a second inner rail 18 in a parallel manner. Also at least one of rods 16 may have a stop 16S to prevent saw unit 13 from being removed off rods 16. Having such construction allows the user to cut a workpiece W having a width greater than the width of table 12 and/or base 11.

In order to move the outer rails 19, the operator need only push on saw unit 13. Alternatively, a knob assembly 400 may be provided in base 11. Knob 154 is connected to a pinion 410, which meshes with two pinions 411. Preferably pinions 411 have the same diameter and/or distance between teeth. Pinions 411 then mesh with the corresponding outer rails 19. Accordingly, when user rotates knob 154, pinions 410 and 411 rotate, moving outer rails 19 in the same direction and speed.

Figure 9:
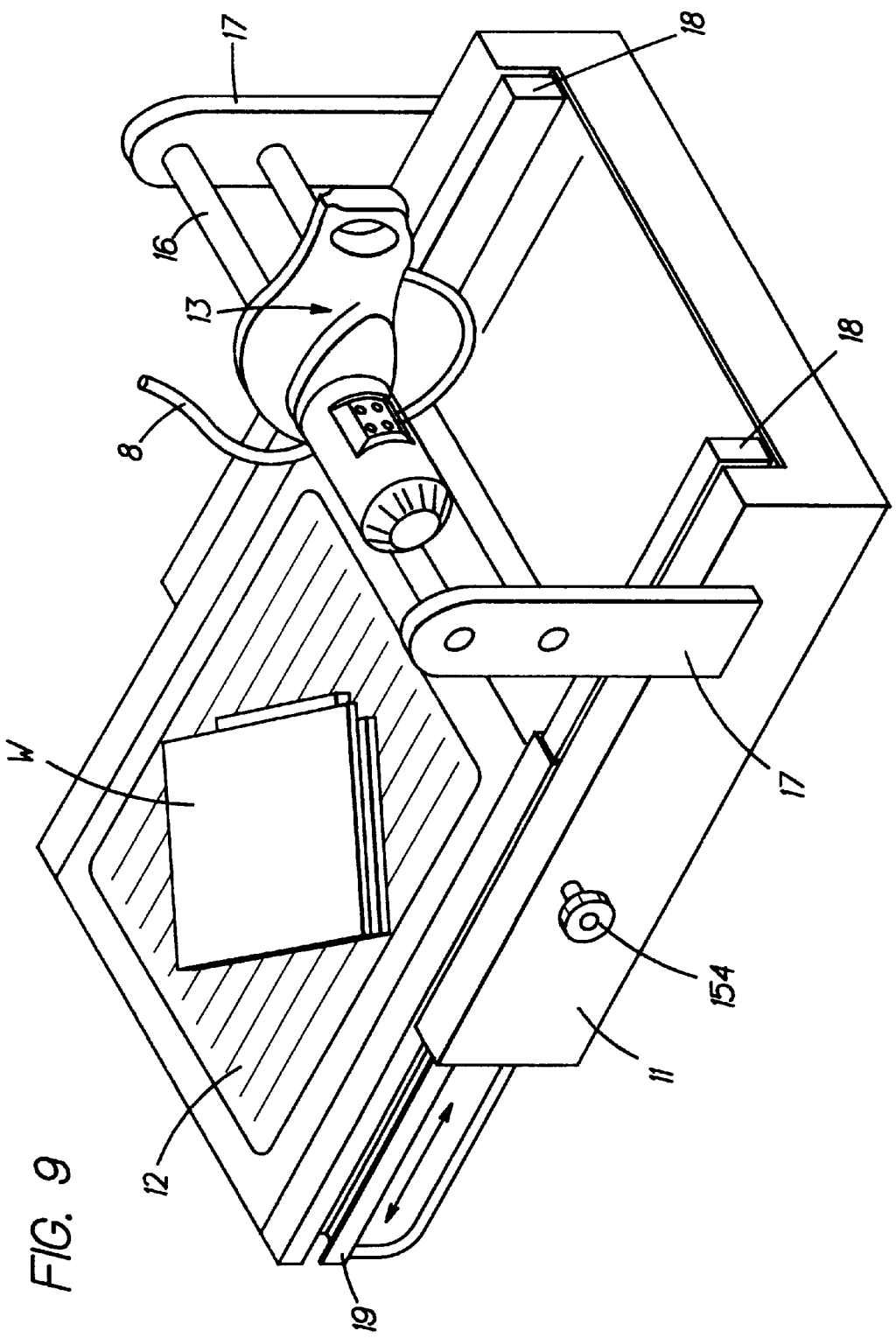
FIG. 9 is a perspective side view of a third embodiment of a tile saw according to the present invention.

FIG. 9 illustrates a third embodiment of the tile saw according to the present invention, where like numerals refer to like parts. This embodiment operates in a similar manner to the previous embodiments. The main difference between this embodiment with the first embodiment is that the table 12 is fixedly attached to the outer rails 19, so that the table 12 can be moved relative to saw unit 13 and base 11. Accordingly, carriages 17 are fixedly connected to base 11. In addition, a sheet 20 may be attached to table 12, so that water from table 12 is collected on sheet 20 and drained into base 11. Sheet 20 is preferably pliable so that it can follow table 12 through the entire range of motion. As mentioned above, the user need only push the table 12 13 to cut the workpiece. Alternatively, the user may turn knob 154, thus rotating pinion shaft 150 and forcing outer rails 19 (and thus table 12) to move.

Figure 10:
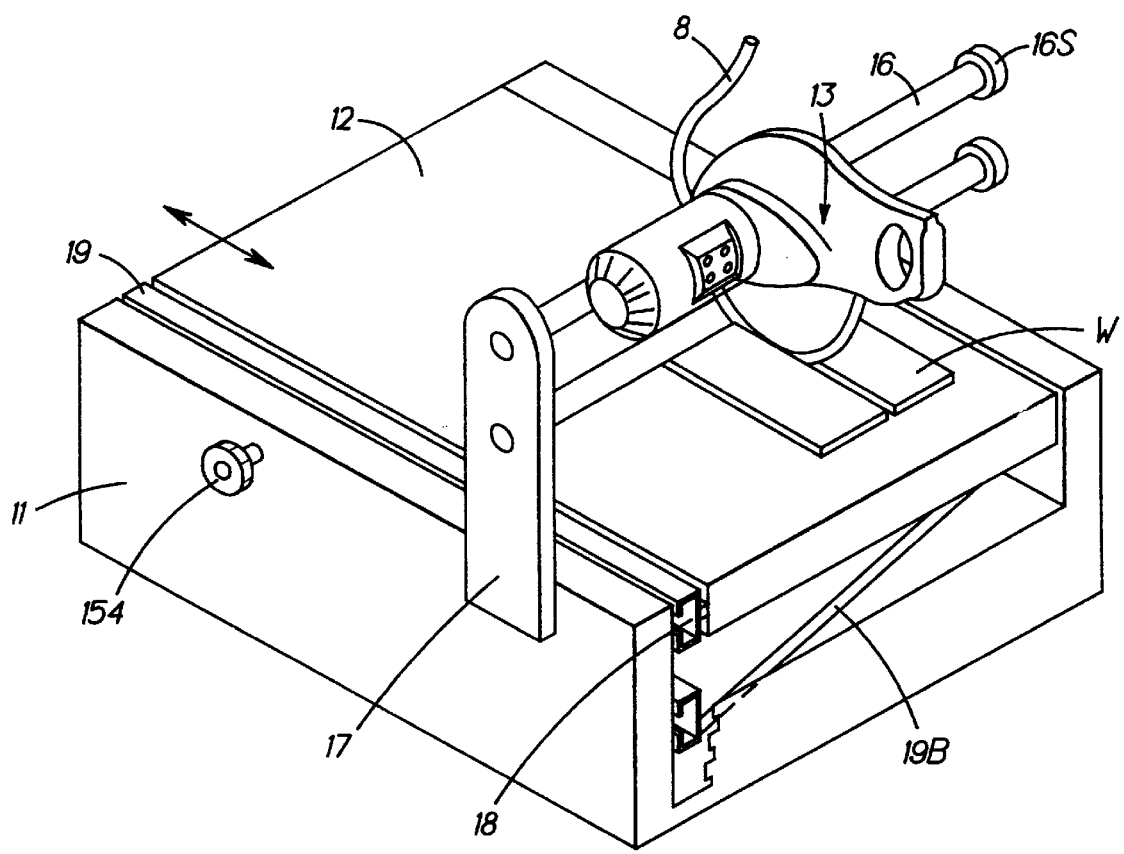
FIG. 10 is a perspective side view of a fourth embodiment of a tile saw according to the present invention.

FIG. 10 illustrates a fourth embodiment of the tile saw according to the present invention, where like numerals refer to like parts. This embodiment operates in a similar manner to the previous embodiments. The main differences between this embodiment and the third embodiment is that: (1) inner rails 18 may be attached on the same side of base 11; and/or (2) rods 16 may be cantilevered. Preferably a first inner rail 18 is disposed above a second inner rail 18 in a parallel manner. Also at least one of rods 16 may have a stop 16S to prevent saw unit 13 from being removed off rods 16. Having such construction allows the user to cut a workpiece W having a width greater than the width of table 12 and/or base 11.

Preferably the lower outer rail 19 supports the table 12 via a beam 19B.

In order to move the outer rails 19, the user need only push table 12. Alternative, a knob assembly similar to knob assembly 400 may be provided in base 11. Accordingly, when user rotates knob 154, pinions 410 and 411 rotate, moving outer rails 19 in the same direction and speed.

FIG. 11 illustrates a fifth embodiment of the tile saw according to the present invention, where like numerals refer to like parts. This embodiment operates in a similar manner to the first and third embodiments. The main differences between this embodiment and the third embodiment is that: (1) saw unit 13 is disposed below table 12; and/or (2) table 12 is split in order to allow blade 14 to extend therethrough throughout the range of movement of table 12.

Saw unit 13 may have a riving knife 13K connected thereto so that the cut pieces of workpiece W do not contact each other. The use and installation of riving knife 13K is well known in the art.

Preferably water conduit 8 (not shown) is disposed below table 12 for lubricating and cooling the blade 13, as is known in the art.

Persons skilled in the art may recognize other alternatives to the means disclosed herein. However, all these additions and/or alterations are considered to be equivalents of the present invention.

What is claimed is:

1. A saw comprising:
   a base having a first length extending generally along a first direction;
   a table disposed on the base;
   a saw unit disposed on the base one of the table and the saw unit being movable relative to the base along the first direction over a range which exceeds the first length;
   a first stationary rail connected to the base and extending generally along the first direction;
   a first movable rail engaging the first stationary rail and extending generally parallel to the first stationary rail, the first movable rail being connected to the one of the table and saw unit; and
   a first rack disposed on the first movable rail, and a first pinion disposed on one of the base and the first stationary rail, wherein the first pinion meshes with the first rack so that the first movable rail moves along the first direction upon rotation of the first pinion.

2. The saw of claim 1, wherein the first movable rail is slidingly received over the first stationary rail.

3. The saw of claim 1, further comprising:
   a second stationary rail connected to the base and extending generally along the first direction and substantially parallel to the second stationary rail; and
   a second movable rail engaging the second stationary rail and extending generally parallel to the first movable and second stationary rails, the second movable rail being connected to the one of the table and saw unit.

4. The saw of claim 3, wherein the second movable rail is slidingly received over the second stationary rail.

5. The saw of claim 3, further comprising a second rack disposed on the second movable rail, and a second pinion disposed on the base, wherein the second pinion meshes with the second rack so that the second movable rail moves along the first direction upon rotation of the second pinion.

6. The saw of claim 1, wherein the saw unit is movable along a second direction substantially perpendicular to the first direction.

7. The saw of claim 1, wherein the saw unit is substantially above the table.

8. The saw of claim 1, wherein the saw unit is substantially underneath the table.

\* \* \* \* \*

UNITED STATES PATENT AND TRADEMARK OFFICE
CERTIFICATE OF CORRECTION

PATENT NO. : 6,427,677 B1 Page 1 of 1
APPLICATION NO. : 09/413769
DATED : August 6, 2002
INVENTOR(S) : Michael L. O'Banion, Daniel Puzio and Jason D. Hardebeck It is certified that error appears in the above-identified patent and that said Letters Patent is hereby corrected as shown below:

Title page, Item [60] Related U.S. Application Data:
Replace "60/106,658" with --60/106,568--.

Column 1, line 4:
Replace "60/106,658" with --60/106,568--.

Signed and Sealed this

Twenty-seventh Day of May, 2008

JON W. DUDAS
*Director of the United States Patent and Trademark Office*